United States Patent
Eun et al.

(10) Patent No.: US 12,496,025 B2
(45) Date of Patent: Dec. 16, 2025

(54) METHOD FOR PROVIDING THE INFORMATION FOR DIAGNOSING OF NONALCOHOLIC STEATOHEPATITIS

(71) Applicant: CHUNGNAM NATIONAL UNIVERSITY HOSPITAL, Daejeon (KR)

(72) Inventors: Hyuk Soo Eun, Daejeon (KR); Hong Jae Jeon, Sejong-si (KR); Ha Neul Kim, Pyeongtaek-si (KR)

(73) Assignee: CHUNGNAM NATIONAL UNIVERSITY HOSPITAL, Daejeon (KR)

( * ) Notice: Subject to any disclaimer, the term of this patent is extended or adjusted under 35 U.S.C. 154(b) by 0 days.

(21) Appl. No.: 18/615,582

(22) Filed: Mar. 25, 2024

(65) Prior Publication Data

US 2024/0341708 A1    Oct. 17, 2024

(30) Foreign Application Priority Data

Apr. 14, 2023    (KR) .................. 10-2023-0049103

(51) Int. Cl.
*A61B 6/50*    (2024.01)
*A61B 6/03*    (2006.01)
*A61B 6/46*    (2024.01)

(52) U.S. Cl.
CPC ............. *A61B 6/50* (2013.01); *A61B 6/032* (2013.01); *A61B 6/461* (2013.01)

(58) Field of Classification Search
CPC ............ A61B 6/50; A61B 6/032; A61B 6/461
See application file for complete search history.

(56) References Cited

U.S. PATENT DOCUMENTS

2017/0148156 A1*    5/2017    Bregman-Amitai .................. A61B 6/5217

FOREIGN PATENT DOCUMENTS

| KR | 10-1324704 B1 | 11/2013 |
| KR | 10-1700485 B1 | 1/2017 |

OTHER PUBLICATIONS

Kim et al., "CT-based Hounsfield unit values reflect the degree of steatohepatitis in patients with low-grade fatty liver disease", BMC Gastroenterol., Mar. 17, 2023; 23(1):77, 14 pages.
Kleiner et al., "Design and Validation of a Histological Scoring System for Nonalcoholic Fatty Liver Disease", Hepatology, 2005, vol. 41, pp. 1313-1321.
Lee, "Imaging evaluation of non-alcoholic fatty liver disease: focused on quantification", Clin Mol Hepatol., 2017, vol. 23, pp. 290-301.

* cited by examiner

*Primary Examiner* — Chao Sheng
(74) *Attorney, Agent, or Firm* — Vorys, Sater, Seymour and Pease LLP; Mih Suhn Koh

(57) ABSTRACT

Provided is a method for providing the information for diagnosing nonalcoholic steatohepatitis.

2 Claims, 9 Drawing Sheets

METHOD FOR PROVIDING THE INFORMATION FOR DIAGNOSING OF NONALCOHOLIC STEATOHEPATITIS

BACKGROUND

Technical Field

The present invention relates to a method for providing information for diagnosing of nonalcoholic steatohepatitis.

Background Art

Nonalcoholic fatty liver disease (NAFLD) is the most common liver disease worldwide, characterized by excessive accumulation of intrahepatic fat associated with insulin resistance. Worldwide, the prevalence of NAFLD diagnosed by imaging tests is approximately 25.24%. Patients diagnosed with nonalcoholic steatohepatitis (NASH), a progressive form of NAFLD histologically characterized by intrahepatic inflammation along with hepatic steatosis, have an increased risk of progression of fibrosis, liver cirrhosis, and hepatocellular carcinoma.

Liver biopsy is the gold standard for diagnosing NAFLD. Based on the percentage of hepatocytes that contain fat vacuoles, hepatic steatosis is classified as normal or grade 0 if steatotic hepatocytes are <5%; mild or grade 1 if 5%-33%; moderate or grade 2 if 34%-66%; and severe or grade 3 if >66%. However, liver biopsy is an invasive technique with potentially fatal complications. Therefore, noninvasive methods for diagnosing fatty liver are preferred in various clinical settings. In particular, ultrasound is the most commonly used method. However, ultrasound is operator-dependent and has suboptimal performance in diagnosing mild steatosis and grading the severity of hepatic steatosis. Therefore, CT is often used as an initial evaluation for patients with elevated liver enzyme levels and suspected hepatic steatosis, especially patients with obesity with poor sonic window on ultrasound examination. In many studies, both the liver HU value measured through CT and the difference between the HU value of the liver and spleen (L-S HU value) have been proven to be useful tools for diagnosing fatty liver disease. The scores using serum biomarkers could provide an alternative mean for diagnosing NAFLD. Considering the under-diagnosis of and the lack of adequate care for NAFLD in the primary care setting, introducing an effective but simple steatosis scoring system that can be easily used by primary care providers is necessary. The hepatic steatosis index (HSI) and the fatty liver index (FLI) are ones of the simplest and consist of easily obtainable information. HSI consists of sex, the presence of type 2 diabetes mellitus, body mass index (BMI), and aspartate aminotransferase (AST) and alanine aminotransferase (ALT) levels, while FLI consists of BMI, waist circumference, triglycerides level, and gamma-glutamyl transferase (GGT) level. However, studies which aimed to evaluate the usefulness of noninvasive methods, including CT, the HSI, and the FLI, in diagnosing mild hepatic steatosis, which is relatively common in clinical practice, are few. Additionally, whether the HU value of CT, the HSI, or the FLI correlates with the histological severity of hepatic steatosis remains unclear.

Meanwhile, several guidelines have stated that these noninvasive methods have limitations in diagnosing steatohepatitis. The presence of steatohepatitis is known to be the most important factor in the progression of fibrosis, while the severity of fibrosis is the most important histologic marker associated with the incidence of liver-related complications and mortality in patients with NAFLD. In addition, since improvement of intrahepatic inflammation is known to be associated with improvement of fibrosis, the improvement of intrahepatic inflammation has been used as surrogate endpoints in various clinical trials. NAFLD activity score (NAS) is a widely used scoring system to evaluate the degree of steatohepatitis in patients with NAFLD. NAS is based on histological findings and calculated by scoring the degree of steatosis, hepatocyte ballooning and inflammation and summing these values. The usefulness of NAS has been confirmed in several studies and is recommended as a method for evaluating changes in liver histology in patients with NASH. However, since liver biopsy is invasive and carries the risk of complications, it has limitations in being used as a method for evaluating the improvement of steatohepatitis in a general clinical practice.

While several guidelines have stated that noninvasive tests are not acceptable alternative to liver biopsy for the diagnosis of NASH, few studies have been conducted on whether noninvasive tests are useful for evaluating the severity of intrahepatic inflammation in patients with liver biopsy-proven NAFLD. If there is a noninvasive method that can evaluate the severity of intrahepatic inflammation in patients with liver biopsy-proven NAFLD, it will be useful for determining the effectiveness of treatment in clinical situations.

Therefore, the present invention aimed to evaluate whether the L-S HU value of CT could be helpful in predicting the degree of inflammation in patients with hepatic steatosis.

BRIEF DESCRIPTION OF THE INVENTION

Summary

In order to solve the above problems, the purpose of the present invention is to provide a method for providing diagnostic information for nonalcoholic steatohepatitis.

Technical Solution

In order to solve the problems, the present invention provides a method for estimating a nonalcoholic fatty liver disease activity score (NAS), comprising:

the step of obtaining an abdominal computed tomography (CT) image;

the step of calculating a value obtained by subtracting the average HU value of the spleen from the average HU value of the liver (L-S HU) in the image; and the step of calculating a nonalcoholic fatty liver disease activity score using the L-S HU.

In the present invention, "Computed tomography (CT)" is a technology that involves entering a circular machine with an X-ray generator to obtain a cross-sectional image of the subject's body. Therefore, the X-ray generator is located on one side of the subject, and the X-ray detector is configured on the opposite side, and an aimed X-ray beam passes through the area desired to be imaged from several directions with uniform intensity, and the attenuated X-ray dose from the other side is acquired and measured with a detector, and then an image is created. Therefore, the degree of absorption of X-rays is very important for each pixel that makes up the image of computed tomography. Wherein, the degree of absorption of X-rays is called a computed tomography value, or Hounsfield Unit (HU), named after the inventor of computed tomography. Wherein, the HU value is 0 for water, −1000 for air, and +1000 for dense bone, and other materials have values between −1000 and +1000 depending on the degree of X-ray attenuation.

In the present invention, "NAFLD activity score (NAS)" is a widely used scoring system to evaluate the degree of intrahepatic inflammation in NAFLD patients, and NAS is based on histological findings and calculated by scoring the degree of steatosis, hepatocyte ballooning, and inflammation and summing these values. Specifically, NASH can be determined by the sum of the histopathology score of the liver biopsy for steatosis (0-3), inflammation (0-3), and hepatocyte ballooning (0-2). A NAS of less than 3 corresponds to hepatic steatosis, 3~4 corresponds to borderline NASH, and 5 or more corresponds to NASH.

In one example of the present invention, the present invention provides a method of providing diagnostic information for nonalcoholic steatohepatitis, comprising:

the step of obtaining the abdominal computed tomography (CT) image;

the step of calculating a value obtained by subtracting the average HU value of the spleen from the average HU value of the liver (L-S HU) in the image;

the step of calculating a nonalcoholic fatty liver disease activity score (NAS) using the L-S HU; and the step of displaying the degree of nonalcoholic steatohepatitis (NASH) according to the NAS level.

In another example of the present invention, the present invention provides a diagnostic device of nonalcoholic steatohepatitis, comprising:

a storage unit for storing abdominal computed tomography (CT) images;

a calculation unit that calculates a value obtained by subtracting the average HU value of the spleen from the average HU value of the liver (L-S HU) in the image;

an arithmetic unit that calculates the L-S HU into a nonalcoholic fatty liver disease activity score (NAS); and a display unit that displays the degree of nonalcoholic steatohepatitis (NASH) according to the NAS level.

In this specification, "diagnostic device" refers to a device capable of diagnosing diseases and providing disease information from images acquired from computed tomography (CT), etc., and is not limited as long as it is in a form that can quantify and analyze the images.

The step of calculating may use Equation 1 below.

$$NAS = 2.889 - (0.062 \times [L - SHU])  \quad \text{[Equation 1]}$$

If the NAS is 3 or more, it may be classified as nonalcoholic steatohepatitis.

Effect of the Invention

The present invention relates to a method of providing diagnostic information for nonalcoholic steatohepatitis, and not only enables accurate diagnosis of the severity of fatty liver and intrahepatic inflammation, using the Hounsfield Unit (HU) as a result of abdominal computed tomography, through non-contrast abdominal computed tomography images obtained by irradiating a small amount of radiation without using a contrast agent, for fatty liver disease, which could previously be evaluated only by combining various tests such as ultrasound, blood tests, and biopsies in clinical practice, but also can be used as an imaging biomarker that can evaluate the degree of improvement following treatment.

DETAILED DESCRIPTION OF THE INVENTION

Figure 1:
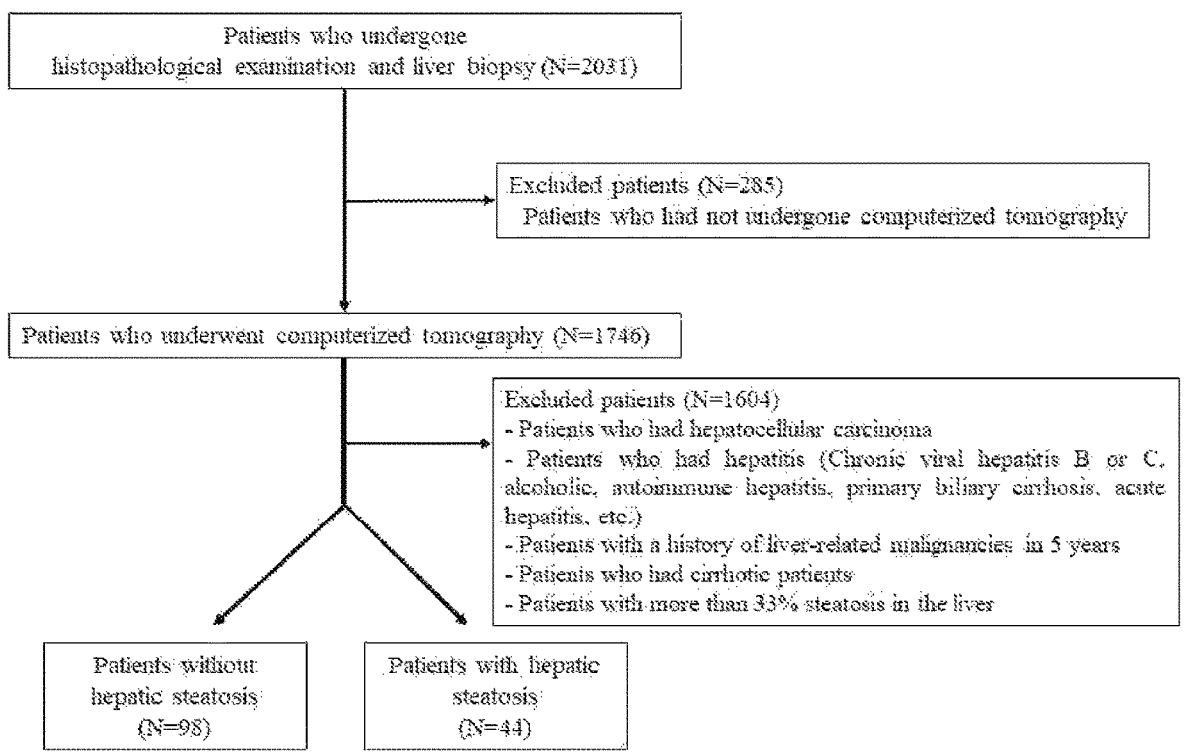
FIG. 1 shows the flow chart showing enrollment of patients who underwent liver biopsy or liver resection.

Hereinafter, the present invention will be described in more detail through examples. However, the following examples are for illustrating the present invention and the scope of the present invention is not limited to the following examples.

<Example 1> Research Design and Subjects

Patients aged between 18 and 75 years who underwent histological examination of liver resection or the liver biopsy at Chungnam National University Hospital between January 2008 and December 2022 were surveyed. Patients who underwent CT within 3 months prior to liver resection or liver biopsy were included, and their electronic medical records were retrospectively reviewed. Patients with steatosis exceeding 33% of hepatocytes on liver biopsy were excluded, and only patients with mild or grade 1 or less hepatic steatosis were enrolled.

Also, patients with a magnetic resonance imaging proton density fat fraction (MRI-PDFF) of less than 33% among patients who underwent MRI-PDFF and CT within 6 months of MRI-PDFF at Chungnam National University Hospital were enrolled. Patients with other liver diseases, such as chronic viral hepatitis B, chronic viral hepatitis C, autoimmune hepatitis, and primary biliary cholangitis, and those with excessive alcohol consumption (>30 g/d of alcohol consumption for men and >20 g/d for women) were excluded. Additionally, patients with liver cirrhosis and a history of hepatocellular carcinoma or other liver-related malignancies within 5 years were also excluded.

<Example 2> Data Collection, Calculation of the HSI and the FLI, and Measurement of the HU Value The histological data of the enrolled patients were reviewed and demographic, laboratory, CT imaging, and MRI-PDFF data by investigating electronic medical records were collected. From the data collected, the HSI and the FLI were calculated. The HSI was calculated as '8×(ALT/AST ratio)+BMI (+2, if female; +2, if with DM)', while the FLI was calculated as '$(e^{0.953 \times ln(TG)+0.139 \times BMI+0.718 \times ln(GGT)+0.053 \times WC-15.745}/1+e^{0.953 \times ln(TG)+0.139 \; BMI+0.718 \times ln(GGT)+0.053 \times WC-15.754}) \times 100$'. Also, to measure the HU values of the liver and spleen, only pre-contrast CT images were used. Specifically, the HU values of ten randomly selected parts of the liver and spleen were measured, and the averages of HU values were calculated. The area measured at each time was set to 2.5-3 cm$^2$. The average HU values of the liver was defined as the liver HU value. The L-S HU value was calculated by subtracting the average HU value of the spleen from the average HU value of the liver.

<Example 3> Definition of Hepatic Steatosis, Low-Grade Hepatic Steatosis, Mild Steatosis Grade, and NAS Grade Hepatic steatosis was defined as the accumulation of fat vacuoles in >5% of hepatocytes. In the present invention, low-grade hepatic steatosis was defined as the presence of steatosis in <33% of hepatocytes, and these patients were classified again according to the percentage of hepatic steatosis as follows: steatosis <5%, the mild steatosis grade 0 (mild G0 or mG0) group; steatosis 5%-19%, the mild steatosis grade 1 (mild G1 or mG1) group; and steatosis 20%-33%, the mild steatosis grade 2 (mild G2 or mG2) group. Similarly, patients who underwent MRI-PDFF were classified according to MRI-PDFF as follows: MRI-PDFF <5%, the mild steatosis grade 0 (mild G0 or mG0) group; MRI-PDFF 5%-19%, the mild steatosis grade 1 (mild G1 or mG1) group; and MRI-PDFF 20%-33%, the mild steatosis grade 2 (mild G2 or mG2) group. In the present invention, each NAS grade was defined as follows. NAS<3, the grade 1 (G1); NAS 3-4, grade 2 (G2); and NAS>4, grade 3 (G3).

<Example 4> Statistical Analyses

The Student's t-test for continuous data and chi-squared test for categorical data were used to compare the baseline characteristics between patients with and without hepatic steatosis. The performance of each method to diagnose hepatic steatosis was evaluated by calculating the area under the receiver operating characteristic curve (AUROC). Correlations between variables were determined using Pearson correlation coefficient. Logistic regression analyses were performed to identify independent predictive factors of hepatic steatosis. All factors with a p<0.05 in the univariate analysis were included in the multivariate analysis, with the exception of multivariate analysis to assess whether the HSI or the FLI are an independent predictive factor for hepatic steatosis. In that exceptional case, DM, BMI, and the AST and ALT levels were excluded for calculating the HSI and BMI, waist circumference, TG level, and GGT level were excluded for calculating the FLI due to potential multicollinearity. Student's t-test was used to compare the HSI, liver HU value, L-S HU value and the FLI between the two steatosis grade groups or the two NAS grade groups. All statistical analyses were performed using SPSS (version 26.0; IBM Corp., Armonk, NY, USA).

<Example 5> Statement of Ethics

The present invention was reviewed by the Chungnam National University Hospital Institutional Review Board and was approved for deliberation exemption (IRB approval number: 2020-06-083). All procedures performed in studies involving human participants were in accordance with the ethical standards of the institutional and/or national research committee and with the 1964 Helsinki Declaration and its later amendments or comparable ethical standards. Owing to the retrospective nature of this study, patient informed consent was not required.

<Experimental Example 1> Select Target

The data of 2,031 patients aged 18 to 75 years who underwent liver biopsy or hepatectomy at Chungnam National University Hospital from January 2008 to December 2022 were reviewed. Among these, 1,746 patients underwent CT within 3 months before liver biopsy or hepatectomy, and 285 patients who did not undergo CT were excluded. And among these 1,746 patients, 1,604 patients who did not meet the registration criteria were sequentially excluded. Finally, 142 patients who underwent liver biopsy or hepatectomy were enrolled in this study. Of the 142 patients analyzed, 44 had hepatic steatosis of 5% or more, and 98 had hepatic steatosis of less than 5% or no clinically significant hepatic steatosis (FIG. 1).

<Experimental Example 2> Comparison of the Baseline Characteristics of Patients with and without Hepatic Steatosis The baseline characteristics of the patients are summarized in Table 1. The number of patients classified into the mild steatosis group was 98 (mG0), 33 (mG1), 11 (mG2). And the number of patients classified into the steatohepatitis group using NAFLD activity score (NAS) was 23 (G1), 29 (G2), 6 (G3). BMI and serum AST, ALT, triglyceride (TG), albumin levels, and waist circumference (WC) were significantly higher in patients with hepatic steatosis than in those without hepatic steatosis. The mean HSI value was higher in patients with hepatic steatosis (37.37, 95% confidence interval [CI]: 35.60-39.31) than in those without hepatic steatosis (31.54, 95% CI: 30.62-32.88) (p<0.001), while mean liver HU value and mean L-S HU value were lower in patients with hepatic steatosis (liver HU: 46.56, 95% CI: 45.85-51.75/L-S HU: −1.401, 95% CI: −2.586-3.051) than in those without hepatic steatosis (liver HU: 54.38 95% CI: 53.74-56.63/L-S HU: 7.813, 95% CI: 6.884-9.936) (both p<0.001). The mean FLI value was higher in patients with hepatic steatosis (61.83, 95% CI: 54.07-69.55) than in those without hepatic steatosis (33.06, 95% CI: 27.55-38.89) (p<0.001).

TABLE 1

| | Baseline characteristics | | |
|---|---|---|---|
| Variables | Steatosis (−) (N = 98) | Steatosis (+) (N = 44) | p value |
| Demographic variables | | | |
| Age (years) | 54.53 ± 13.85 | 44.93 ± 14.66 | <0.001*** |
| Gender (M/F) | 34/64 | 22/22 | |
| Body mass index (kg/m²) | 23.05 ± 3.243 | 26.26 ± 3.493 | <0.001*** |
| Comorbidities | | | |
| Diabetes mellitus | 11 (11.2%) | 10 (22.7%) | |
| Hypertension | 11 (11.2%) | 5 (11.4%) | |
| Dyslipidemia | 13 (13.3%) | 3 (6.82%) | |
| Biochemical parameters | | | |
| Aspartate aminotransferase (IU/L) | 28.56 ± 19.72 | 41.55 ± 33.44 | 0.004** |
| Alanine aminotransferase (IU/L) | 26.47 ± 23.40 | 53.02 ± 65.72 | 0.001*** |
| Triglycerides (mg/dL) | 103.6 ± 62.79 | 202.4 ± 124.9 | <0.001** |
| Total cholesterol (mg/dL) | 184.2 ± 46.02 | 200.8 ± 47.92 | 0.068 |
| Total bilirubin (mg/dL) | 0.970 ± 0.985 | 0.932 ± 0.973 | 0.830 |
| Gamma-glutamyl transpeptidase (IU/L) | 119.9 ± 158.0 | 111.8 ± 133.8 | 0.7720 |
| Serum glucose (mg/dL) | 105.9 ± 36.69 | 119.3 ± 45.89 | 0.064 |
| Serum albumin (g/dL) | 3.812 ± 0.580 | 4.161 ± 0.500 | <0.001*** |
| Platelet count (10³/uL) | 247.9 ± 83.54 | 259.9 ± 81.19 | 0.419 |
| Waist circumference (cm) | 81.65 ± 9.249 | 91.64 ± 9.737 | <0.001*** |
| Liver histology | | | |
| Steatosis grade S0/S1/S2/S3 | 98/0/0/0 | 8/36/0/0 | |
| Mild steatosis grade mG0/mG1/mG2 | 98/0/0 | 0/33/11 | |
| METAVIR score F0/F1/F2/F3/F4 | 76/15/6/1/0 | 28/7/6/3/0 | |
| NAFLD activity score grade G1/G2/G3 | 16/0/0 | 7/29/6 | |
| Hepatic steatosis index (mean ± SD) | 31.54 ± 4.090 | 37.37 ± 5.729 | <0.001*** |
| Liver HU (mean ± SD) | 54.38 ± 6.125 | 46.56 ± 9.911 | <0.001*** |
| Liver HU-Spleen HU (mean ± SD) | 7.813 ± 6.198 | −1.401 ± 8.988 | <0.001*** |
| Fatty liver index (mean ± SD) | 33.06 ± 22.97 | 61.83 ± 21.74 | <0.001*** |

Figure 2:
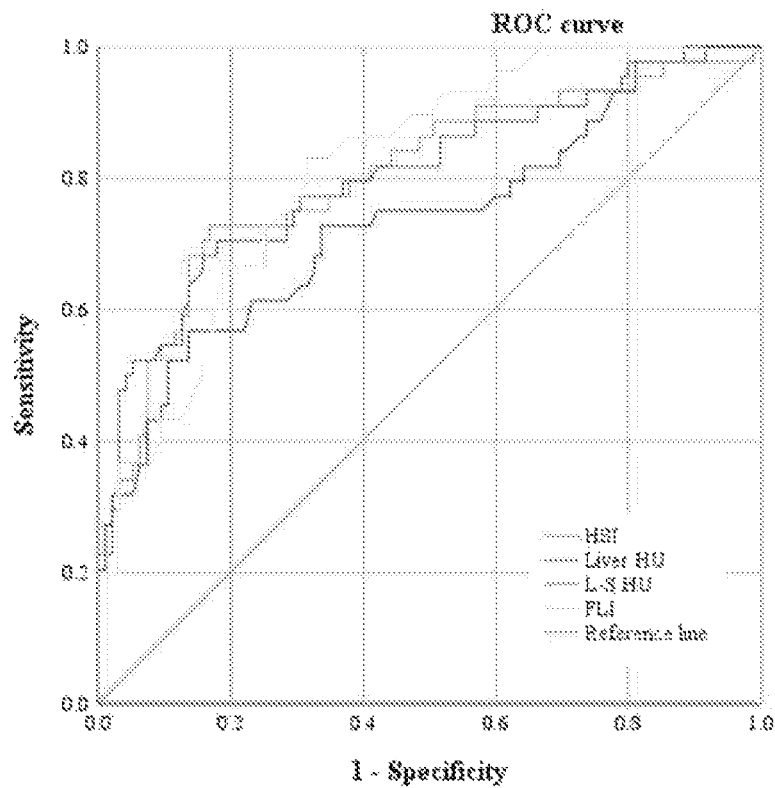
FIG. 2 shows the ROC curves and diagnostic performance of hepatic steatosis index, liver HU value, liver HU value-spleen HU value and fatty liver index for diagnosing mild hepatic steatosis.

<Experimental Example 3> Comparison of Performance of the HSI, Liver HU Value, L-S HU Value and the FLI for Diagnosing Mild Hepatic Steatosis The HSI had the highest AUROC for diagnosing hepatic steatosis (AUROC 0.810), followed by L-S HU value (AUROC 0.802), liver HU value (AUROC 0.732) and the FLI (AUROC 0.813) (FIG. 2). The HSI, with a low cut-off value of 30 and a high cut-off value of 36, diagnosed hepatic steatosis with 87% sensitivity and 74% specificity. Additionally, the L-S HU value with a cut-off value of 3 diagnosed hepatic steatosis with 70% sensitivity and 82% specificity, while the liver HU value with a cut-off value of 47 diagnosed hepatic steatosis with 54% sensitivity and 89% specificity. The FLI, with a low cut-off value of 30 and a high cut-off value of 60, diagnosed hepatic steatosis with 85% sensitivity and 77% specificity.

<Experimental Example 4> Factors Associated with Hepatic Steatosis

The univariate analysis revealed that age, BMI, serum AST, ALT, TG, albumin levels, WC, the HSI, liver HU value, L-S HU value and the FLI were associated with hepatic steatosis. In the multivariate analysis, HSI, L-S HU value and the FLI remained as independent diagnostic factors for hepatic steatosis (Table 2~4). In patients with hepatic steatosis, the liver HU value was negatively correlated with BMI, AST, ALT, TG and glucose level. The L-S HU value was also negatively correlated with BMI, AST, ALT, TG and glucose level in patients with hepatic steatosis (data not shown).

TABLE 2

| | Univariate analysis | | Multivariate analysis | |
|---|---|---|---|---|
| Variables | OR (95% CI) | p value | OR (95% CI) | p value |
| Age | 0.96(0.93-0.98) | 0.001*** | 0.99(0.94-1.04) | 0.636 |
| Hypertension | 0.90(0.29-2.80) | 0.851 | | |
| Hyperlipidemia | 2.28(0.62-8.37) | 0.215 | | |
| HSI | 1.31(1.18-1.45) | <0.001*** | 1.32(1.09-1.61) | 0.005** |
| TG (mg/dL) | 1.01(1.01-1.02) | <0.001*** | 1.01(1.00-1.02) | 0.037* |
| TC (mg/dL) | 1.01(1.00-1.02) | 0.067 | | |
| TB (mg/dL) | 0.96(0.65-1.41) | 0.830 | | |
| GGT (U/L) | 1.00(1.00-1.00) | 0.781 | | |
| Glucose (mg/dL) | 1.01(1.00-1.02) | 0.076 | | |

TABLE 2-continued

| Variables | Univariate analysis OR (95% CI) | p value | Multivariate analysis OR (95% CI) | p value |
|---|---|---|---|---|
| Albumin (g/dL) | 4.79(1.89-12.1) | 0.001*** | 14.3(1.79-113.3) | 0.012* |
| Platelets($10^3$/μL) | 1.00(1.00-1.01) | 0.422 | | |
| Waist circumference (cm) | 1.12(1.07-1.17) | <0.001*** | 1.00(0.93-1.08) | 0.933 |

CI = confidence interval,
HU = Hounsfield unit

Multivariate analysis adjusted model: Diabetes, body mass index (BMI), aspartate aminotransferase (AST) and alanine aminotransferase (ALT) were excluded because they were correlated with HSI.

TABLE 3

| Variables | Univariate analysis OR (95% CI) | p value | Multivariate analysis OR (95% CI) | p value |
|---|---|---|---|---|
| Age | 0.96(0.93-0.98) | 0.001*** | 0.99(0.94-1.04) | 0.712 |
| Diabetes | 0.44(0.17-1.12) | 0.084 | | |
| Hypertension | 0.90(0.29-2.80) | 0.851 | | |
| Hyperlipidemia | 2.28(0.62-8.37) | 0.215 | | |
| L-S HU | 0.84(0.78-0.90) | <0.001*** | 0.84(0.74-0.96) | 0.011** |
| BMI | 1.33(1.17-1.50) | <0.001*** | 1.07(0.77-1.47) | 0.690 |
| AST (U/L) | 1.02(1.01-1.04) | 0.010** | 0.99(0.95-1.04) | 0.779 |
| ALT (U/L) | 1.02(1.01-1.04) | 0.003** | 1.02(0.98-1.07) | 0.333 |
| TG (mg/dL) | 1.01(1.01-1.02) | <0.001*** | 1.01(1.00-1.02) | 0.041* |
| TC (mg/dL) | 1.01(1.00-1.02) | 0.067 | | |
| TB (mg/dL) | 0.96(0.65-1.41) | 0.830 | | |
| GGT (U/L) | 1.00(1.00-1.00) | 0.781 | | |
| Glucose (mg/dL) | 1.01(1.00-1.02) | 0.076 | | |
| Albumin (g/dL) | 4.79(1.89-12.1) | 0.001*** | 17.2(2.07-142.1) | 0.008** |
| Platelets ($10^3$/μL) | 1.00(1.00-1.01) | 0.422 | | |
| Waist circumference (cm) | 1.12(1.07-1.17) | <0.001*** | 1.01(0.91-1.13) | 0.844 |

CI = confidence interval,
HU = Hounsfield unit

TABLE 4

| Variables | Univariate analysis OR (95% CI) | p value | Multivariate analysis OR (95% CI) | p value |
|---|---|---|---|---|
| Age | 0.96(0.93-0.98) | 0.001** | 0.96(0.91-1.02) | 0.209 |
| Diabetes | 0.44(0.17-1.12) | 0.084 | | |
| Hypertension | 0.90(0.29-2.80) | 0.851 | | |
| Hyperlipidemia | 2.28(0.62-8.37) | 0.215 | | |
| FLI | 1.05(1.03-1.08) | <0.001 | 1.08(1.03-1.13) | 0.002** |
| AST (U/L) | 1.02(1.01-1.04) | 0.010** | 1.00(0.95-1.05) | 0.911 |
| ALT (U/L) | 1.02(1.01-1.04) | 0.003** | 1.02(0.98-1.07) | 0.334 |
| TC (mg/dL) | 1.01(1.00-1.02) | 0.067 | | |
| TB (mg/dL) | 0.96(0.65-1.41) | 0.830 | | |
| Glucose (mg/dL) | 1.01(1.00-1.02) | 0.076 | | |
| Albumin (g/dL) | 4.79(1.89-12.1) | 0.001 | 97.5(6.80-1397.3) | 0.001** |
| Platelets ($10^3$/μL) | 1.00(1.00-1.01) | 0.422 | | |
| Waist circumference (cm) | 1.12(1.07-1.17) | <0.001 | 0.96(0.87-1.06) | 0.447 |

CI = confidence interval,
HU = Hounsfield unit

Multivariate analysis adjusted model: Body mass index (BMI), triglycerides (TG) and gamma-glutamyl transpeptidase (GGT) were excluded because they were correlated with FLI.

Figure 3:
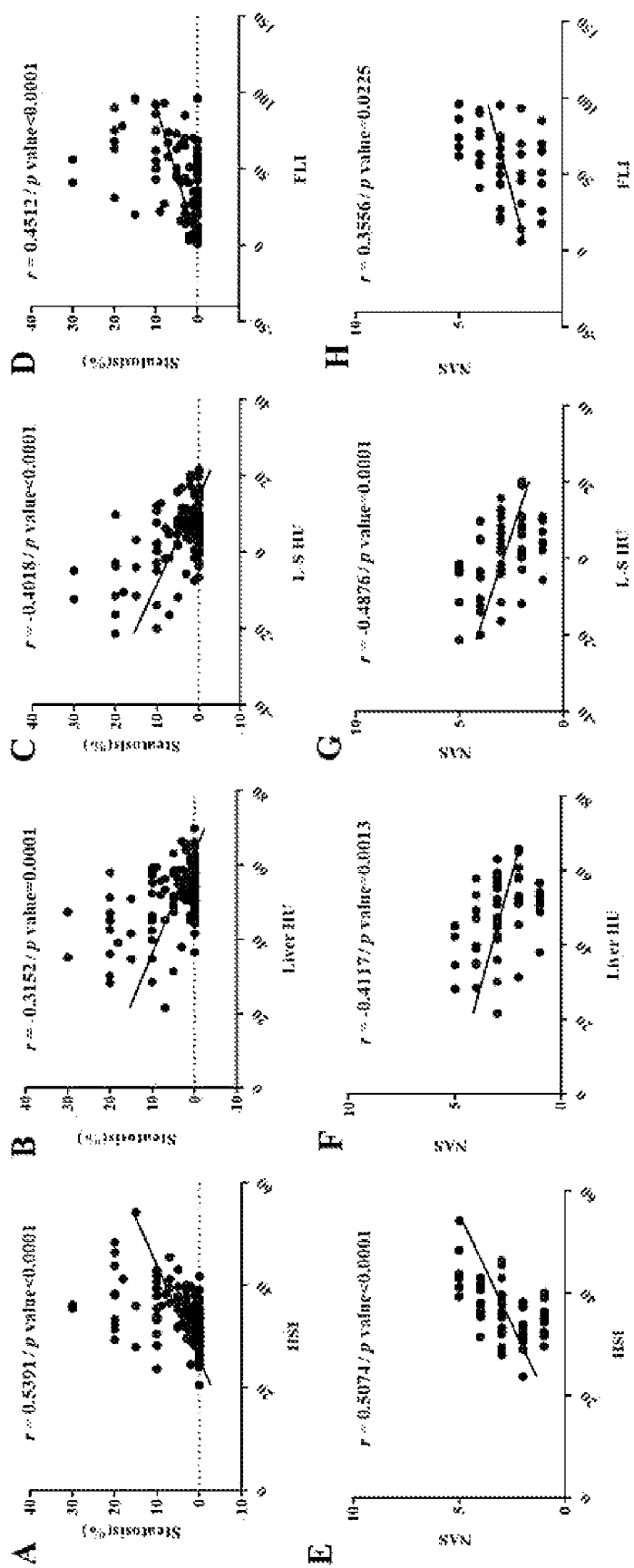
FIG. 3 shows the correlation between each index and the percentage of hepatic steatosis.
Figure 4:
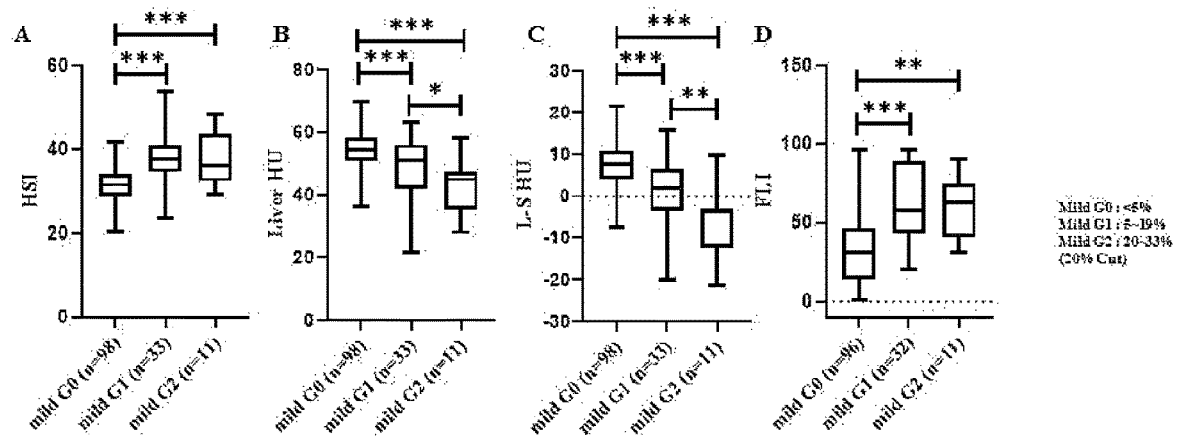
FIG. 4 shows the comparison of each index according to steatosis grade group and performance of each index in grading the severity of hepatic steatosis.

<Experimental Example 5> Distribution and Performance of the HSI, Liver HU Value, L-S HU Value and FLI According to Steatosis Grade Group The percentage of hepatic steatosis was positively correlated with the HSI (r=0.5391) (p<0.0001) or the FLI (r=0.4512) (p<0.0001), and negatively correlated with liver HU value (r=−0.3152) (p=0.0001) or L-S HU value (r=−0.4018) (p<0.0001) (FIG. 3). The mean liver HU value for patients in mG0, mG1, and mG2 was 55.2 (95% CI: 55.15-55.25), 49.49 (95% CI: 49.38-49.60), and 46.93 (95% CI: 46.78-47.08), respectively. Liver HU value was significantly different between mG0 and mG1 (p<0.001) or mG2 (p<0.001) and between mG1 and mG2 (p=0.04) (FIG. 4). Moreover, the mean L-S HU values for patients in mG0, mG1, and mG2 were 8.497 (95% CI: 8.449-8.545), 1.292

(95% CI: 1.190-1.394), and −3.024 (95% CI: −3.166--2.883), respectively. The L-S HU value was also significantly different between mG0 and mG1 (p<0.001) or mG2 (p<0.001) and between mG1 and mG2 (p=0.01). Although the HSI was also significantly different between mG0 and mG1 (p<0.001) or mG2 (p<0.001), the differences between mG1 and mG2 were not statistically significant (p=0.47). The FLI was significantly different between mG0 and mG1 (p<0.001) or mG2 (p=0.016), the differences between mG1 and mG2 were not statistically significant (p=0.43).

<Experimental Example 6> Performance of the HSI, Liver HU Value, L-S HU Value and the FLI in Grading the Severity of Hepatic Steatosis FIG. 4 shows the AUROCs of the HSI, liver HU value, L-S HU value and the FLI for grading the severity of hepatic steatosis. The L-S HU value demonstrated the best performance in grading the severity of low-grade hepatic steatosis. The optimal cut-off L-S HU values were 3 HU for ≥ mG1, and −3 HU for ≥mG2.

Figure 5:
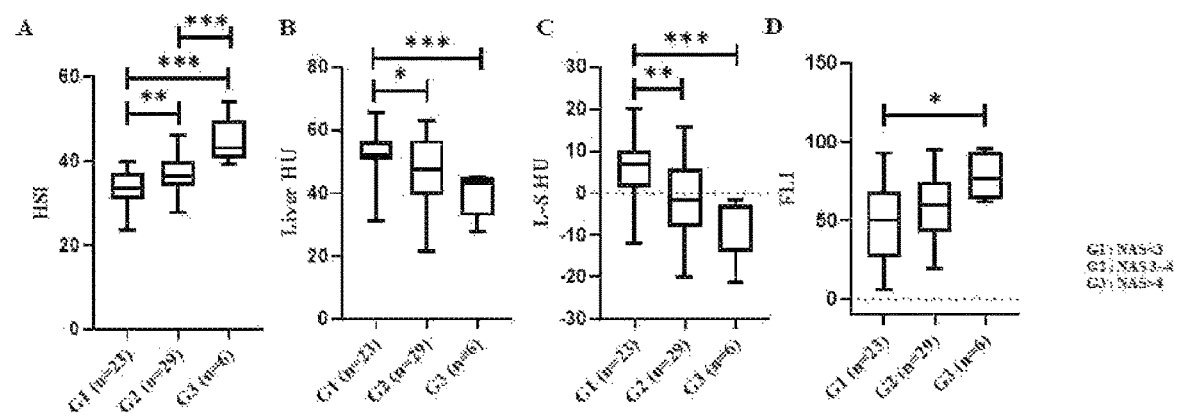
FIG. 5 shows the comparison of each index according to NAFLD activity score group and performance of each index in grading the severity of steatohepatitis.

<Experimental Example 7> Distribution and Performance of the HSI, Liver HU Value, L-S HU Value and the FLI According to NAS Grade Group The NAS was positively correlated with the HSI (r=0.5074) (p<0.0001) or FLI (r=0.3556) (p<0.0001), and negatively correlated with liver HU value (r=−0.4117) (p=0.0013) or L-S HU value (r=−0.4876) (p=0.0001) (FIG. 3). The mean liver HU value for patients in G1, G2, and G3 was 52.49 (95% CI: 49.25-55.73), 47.13 (95% CI: 43.06-51.19), and 40.04 (95% CI: 32.56-47.51), respectively. Liver HU value was significantly different between G1 and G2 (p=0.02) or G3 (p<0.001) (FIG. 5). Moreover, the mean L-S HU values for patients in G1, G2, and G3 were 5.767 (95% CI: 2.632-8.902), −1.060 (95% CI: −4.714-2.593), and −7.35 (95% CI: −15.48-0.781), respectively. The L-S HU value was also significantly different between G1 and G2 (p=0.003) or G3 (p<0.001). The HSI was significantly different between G1 and G2 (p=0.004) or G3 (p<0.001), and between G2 and G3 (p<0.001). The FLI was significantly different between G1 and G3 (p=0.02).

A simple linear regression model was used to predict NAS from L-S HU values by expressing the relationship between L-S HU values and NAFLD activity score (NAS) in the form of a specific function. Therefore, set the population regression line expressed as NAS=α+β*(L-S HU value), which is a straight line representing the change in the average value of NAS according to the L-S HU value, and the least squares method was used to estimate the intercept and slope, a and B, that is, the population regression coefficient. The least squares estimate of a and B obtained through this were 2.889 and −0.062, respectively. Using this, the least squares regression line was obtained as shown below and can be used clinically to estimate the NAS value using the L-S HU value.

$$NAS = 2.889 - (0.062 \times [L - S\,HU])$$ [Equation 1]

<Experimental Example 8> Performance of the HSI, Liver HU Value, L-S HU Value and the FLI in Evaluating the Degree of Steatohepatitis FIG. 5 shows the AUROCs of the HSI, liver HU value, L-S HU value and the FLI for evaluating the degree of steatohepatitis. The L-S HU value, with a cut-off value of −3, predicted whether NAS was 3 or higher or not with 71% sensitivity and 71% specificity. And the L-S HU value, with a cut-off value of −1, predicted whether NAS was 5 or higher or not with 100% sensitivity and 71% specificity. Additionally, the HSI and the FLI had high AUROC for predicting NAS of 3 or more and NAS of 5 or more.

Figure 6:
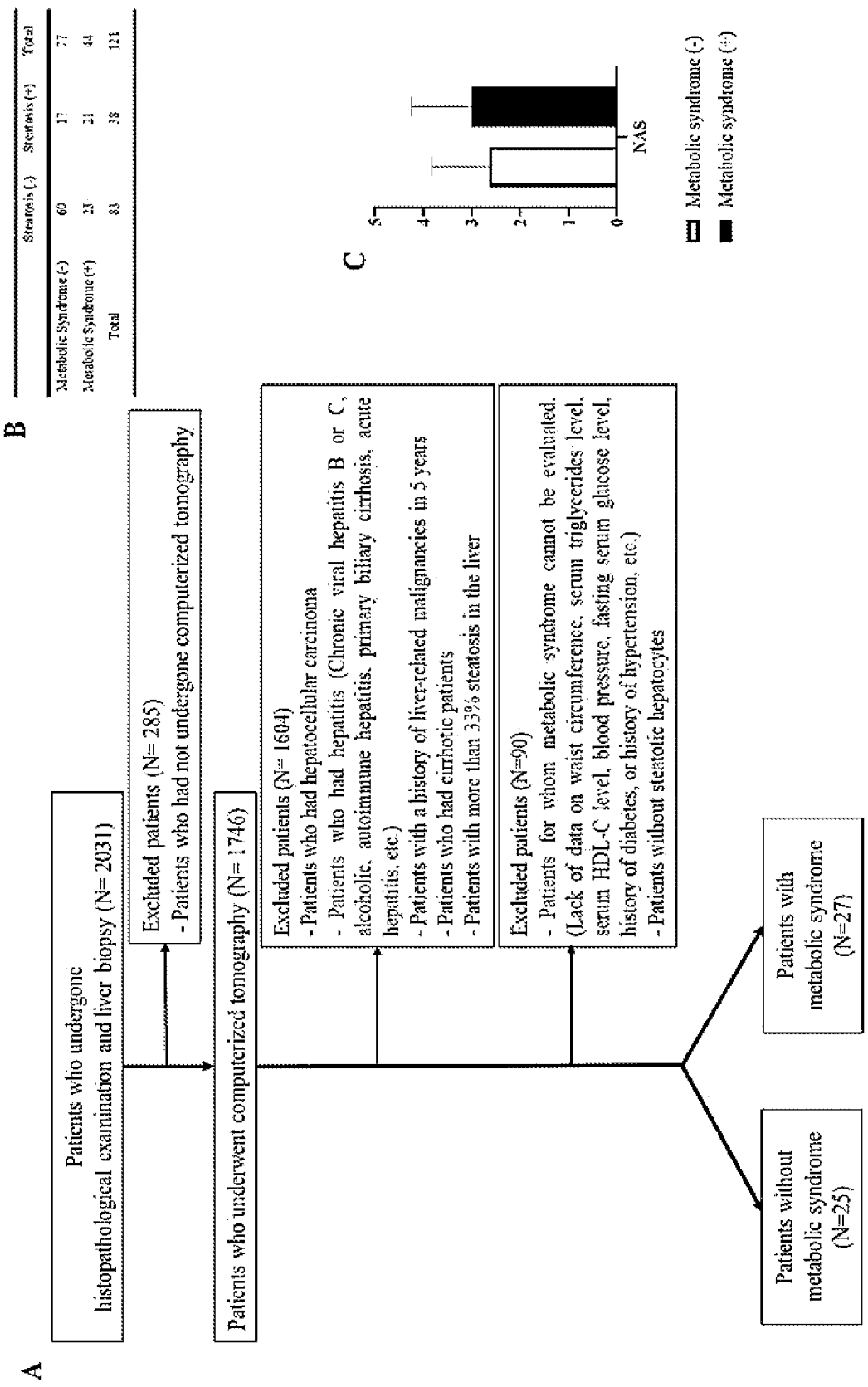
FIG. 6 shows the comparison of the proportion of hepatic steatosis and NAS between patients with and without metabolic syndrome.

<Experimental Example 9> Comparison of NAS Between Patients with and without Metabolic Syndrome Among 2,031 patients aged between 18 and 75 years, who underwent liver biopsy or hepatic resection at Chungnam National University Hospital during study period, 285 patients who didn't underwent CT within 3 months prior to liver biopsy or hepatic resection were excluded (FIG. 6). And among these 1,746 patients, 1,604 patients who did not meet the enroll criteria were sequentially excluded. Metabolic syndrome could not be evaluated in 21 patients of 142 patients due to missing variables. Among 77 patients without metabolic syndrome, hepatic steatosis was observed in 17 patients (22.1%), and among 44 patients with metabolic syndrome, hepatic steatosis was observed in 21 patients (47.8%) (p=0.03). NAS was evaluated in 52 patients with steatotic hepatocytes on liver biopsy and there was no difference in NAS between the group with and without metabolic syndrome (p=0.351).

Figure 7:
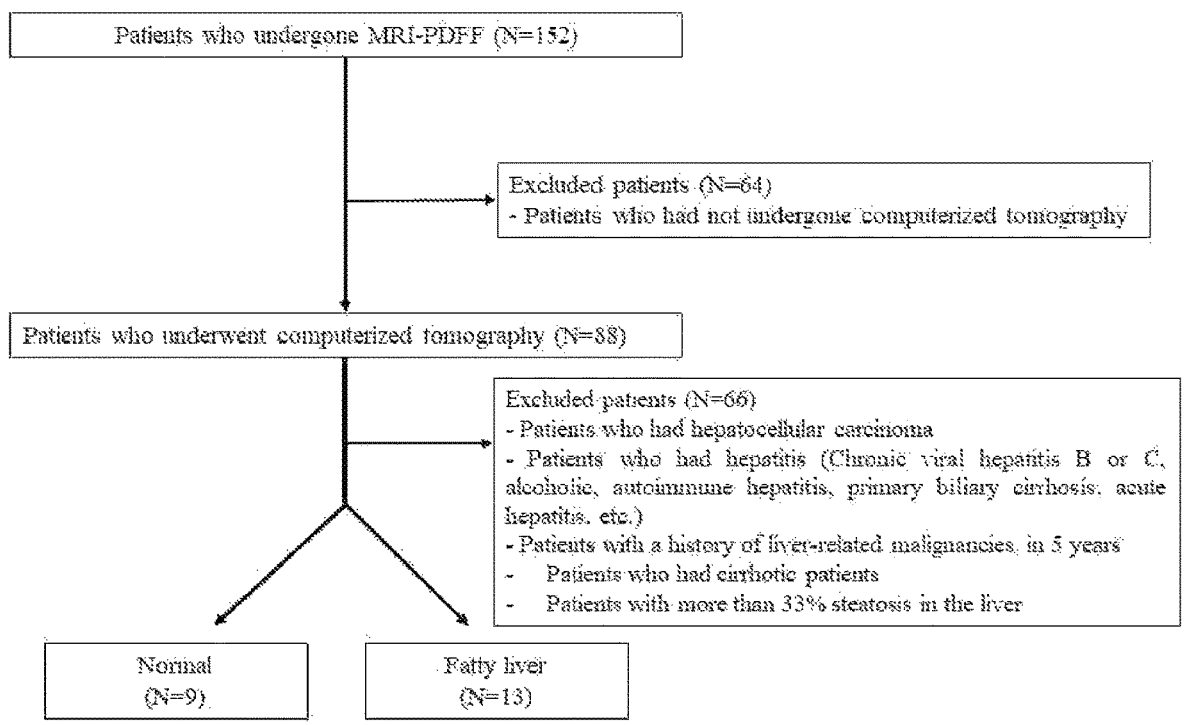
FIG. 7 shows the flow chart showing enrollment of patients who underwent MRI-PDFF.
Figure 8:
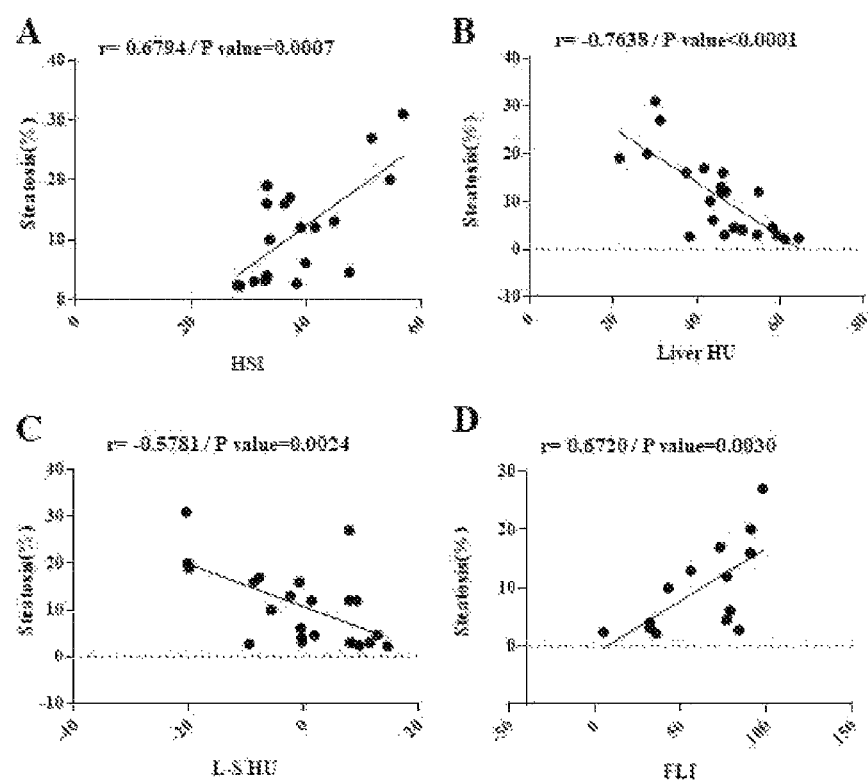
FIG. 8 shows the correlation between each index and MRI-PDFF
Figure 9:
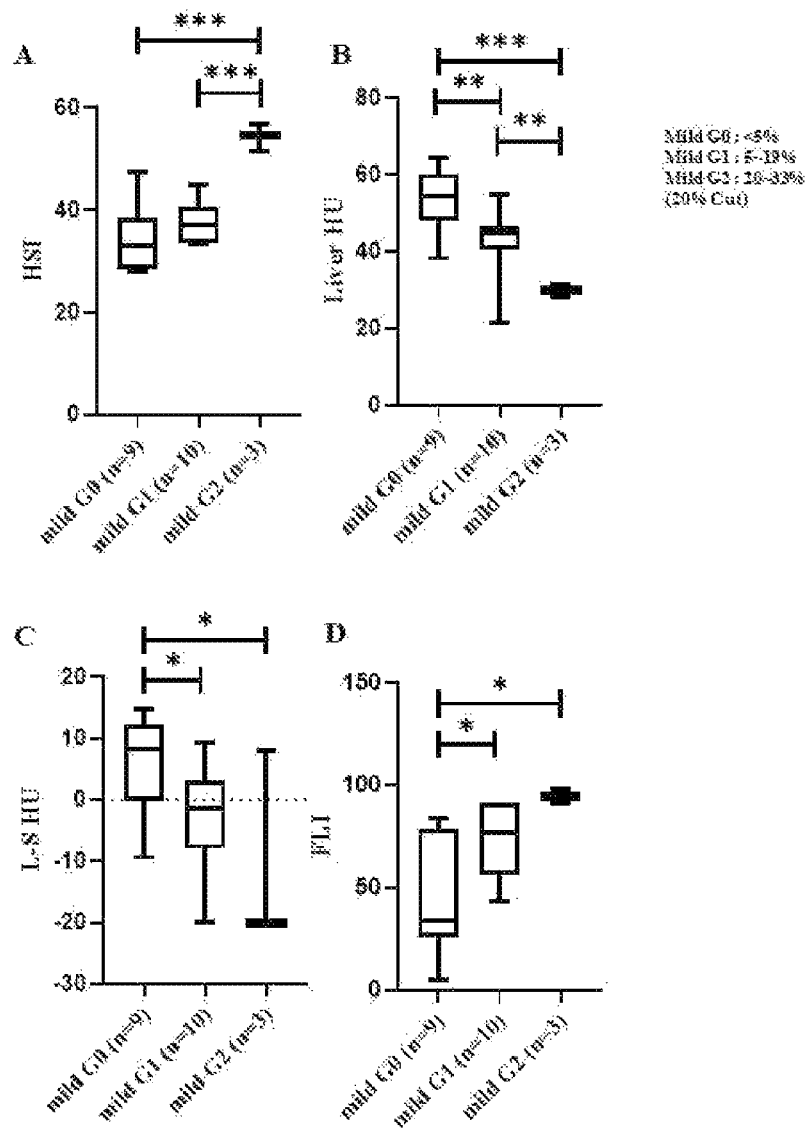
FIG. 9 shows the comparison of each index according to steatosis grade group evaluated by MRI-PDFF and performance of each index in grading the severity of hepatic steatosis.

<Experimental Example 10> Distribution of the Liver HU Value and L-S HU Value According to MRI-PDFF During the experimental period, 152 patients underwent MRI-PDFF at Chungnam National University Hospital, and 88 of them underwent CT within 6 months. Of these 88 patients, 64 did not meet the enroll criteria. Therefore, of the patients who underwent MRI-PDFF, 22 patients were enrolled in our study. Of the 22 patients analyzed, 13 had MRI-PDFF ≥5%, and 9 patients had MRI-PDFF <5% (FIG. 7). The percentage of hepatic steatosis was positively correlated with the HSI (r=0.6794) (p=0.0007) or the FLI (r=0.6720) (p=0.0030), and negatively correlated with liver HU value (r=−0.7638) (p<0.0001) or L-S HU value (r=−0.5781) (p=0.0024) (FIG. 8). The mean liver HU value for patients in mG0, mG1, and mG2 was 53.57 (95% CI: 47.27-59.86), 42.77 (95% CI: 36.55-48.99), and 29.80 (95% CI: 26.05-33.55), respectively. Liver HU value was significantly different between mG0 and mG1 (p=0.006) or mG2 (p<0.001) and between mG1 and mG2 (p=0.014) (FIG. 9). Moreover, the mean L-S HU values for patients in mG0, mG1, and mG2 were 5.47 (95% CI: −0.62-11.6), −2.66 (95% CI: −8.75-3.43), and −10.8 (95% CI: −51.4-29.7), respectively. The L-S HU value was also significantly different between mG0 and mG1 (p=0.02) and between mG0 and mG2 (p=0.02). Although the HSI was significantly different between mG2 and mG0 (p<0.001) or mG1 (p<0.001). The FLI was also significantly different between mG0 and mG1 (p=0.03) and between mG0 and mG2 (p=0.03).

<Experimental Example 11> Discussion

In the present invention, the HU values on CT were useful in quantifying and stratifying liver fat contents in patients with low-grade hepatic steatosis, and the HSI and the FLI was demonstrated good performance with high sensitivity and specificity in diagnosing mild hepatic steatosis. In addition, the HU values were useful in evaluating the degree of intrahepatic inflammation in patients with low-grade hepatic steatosis. Transabdominal ultrasound, which is a commonly used diagnostic test for fatty liver disease in clinical field, has various limitations, such as a poor sonic window in patients with obesity and subjectivity according to the operator, resulting in low accuracy in diagnosing mild hepatic steatosis and evaluating the severity of hepatic steatosis. In these cases, it is possible to diagnose and evaluate fatty liver disease by using a serologic marker using blood test results or by imaging an abdominal CT scan. In this regard, the present invention is the first to present the usefulness of the HSI and the FLI in company with HU value on CT to overcome the limitations of liver ultrasound for the diagnosis and severity assessment of mild fatty liver disease based on the results of histological evaluation of hepatic steatosis. In addition, the present invention first demonstrated that the HU values on CT could be useful in evaluating the degree of steatohepatitis in patients who have already been diagnosed with NAFLD through histological examination.

In patients with NAFLD, lifestyle modification and pharmacological intervention can improve liver histology, and thereby prognosis. Therefore, an accurate diagnosis of fatty liver is important in patients with suspected NAFLD. Many guidelines recommend ultrasound as the first-line tool for diagnosing NAFLD. However, ultrasound exhibits suboptimal performance in diagnosing mild hepatic steatosis. For example, Ahn et al. evaluated hepatic steatosis in living liver donors without evidence of fatty liver on ultrasonography, and have reported a high prevalence of mild hepatic steatosis of 39.6% in ultrasound-negative patients, suggesting that ultrasound cannot exclude mild hepatic steatosis. Moreover, Tanaka et al. have reported that mild hepatic steatosis was diagnosed by biopsy in 28% of patients with elevation of serum ALT levels and normal hepatic ultrasound image. In the present invention, in contrast to low diagnostic accuracy of ultrasound for diagnosing mild hepatic steatosis reported in the literature, the HSI and the FLI demonstrated high performance with AUROC of 0.810 and AUROC of 0.813, respectively, in diagnosing mild hepatic steatosis. The HSI is a non-invasive and non-imaging screening tool devised based on the Korean health check-up data. When low and high cut-off values of the HSI were used to discriminate the presence or absence of NAFLD in patients included in the validation set of the present invention, a sensitivity of 93.1% and specificity of 93.1% were achieved. The FLI was devised based on Italian study which enrolled 280 persons with normal liver and 216 persons with hepatic disease. When high cut-off value of the FLI was used to discriminate the presence of NAFLD in patients, a positive predictive value of 99% and negative predictive value of 15% were achieved. The performance of the HSI and the FLI in diagnosing NAFLD has been validated in various studies. Lee et al. evaluated the performance of several screening scores for diagnosing NAFLD in patients who underwent a health checkup, and the HSI indicated a high AUROC of 0.86. Murayama et al. also evaluated the performance of the HSI, Zhejiang university index, and fatty liver index using ultrasound-diagnosed fatty liver as a reference standard, and the HSI and the FLI demonstrated good predictive ability with AUROC of 0.874 and 0.884, respectively. However, many previous studies validated the performance of the HSI in diagnosing NAFLD using ultrasound as a reference standard. As mentioned above, because diagnosing mild hepatic steatosis using ultrasound may be inaccurate, in our judgment, these studies have some limitations because they are not based on histological evaluation. The present invention was conducted defining fatty liver histologically as the presence of steatosis in >5% of hepatocytes and in particular, we enrolled only patients with mild hepatic steatosis (steatosis in <33% of hepatocytes). Therefore, we confirm good performance of the HSI and the FLI in diagnosing mild hepatic steatosis more objectively and strictly in the present invention than in previous studies. Considering the high sensitivity and specificity of HSI and the FLI for diagnosing mild hepatic steatosis observed in the present invention, additional tests to exclude mild hepatic steatosis might be beneficial for suspected NAFLD in patients with negative US findings but have the HSI of ≥36 or the FLI of ≥60.

The liver HU value showed a low sensitivity in diagnosing mild hepatic steatosis in our study. The low sensitivity of CT in diagnosing mild hepatic steatosis has been reported in several previous studies. In particular, since the liver HU value may be affected by the reconstruction algorithm or the vendor of the CT scanner, the L-S HU value using spleen as an internal control is more commonly used for diagnosing fatty liver disease. Therefore, when compared with the liver HU value in the present invention, the L-S HU value demonstrated significantly higher AUROC value and sensitivity in diagnosing mild hepatic steatosis, suggesting that the L-S HU value has advantage over liver HU value for detecting mild hepatic steatosis.

In addition to the limited diagnostic accuracy of ultrasound in detecting mild hepatic steatosis, the suboptimal performance to evaluate the degree of fatty liver, which may be due to the qualitative and subjective nature that causes inter-observer variability, is another disadvantage of ultrasound. Strauss et al. have reported that the inter-observer agreement for grading the severity of fatty liver using ultrasound was 47.0-63.7%. Qayyum et al. have also reported that the correlation of ultrasound score with histological hepatic steatosis was low due to low inter-observer agreement for ultrasound. In contrast to ultrasound, CT scan is not dependent on the operator. The present invention revealed that the L-S HU value on CT could be better than ultrasound for quantifying and stratifying liver fat content, based on the results of histological evaluation as well as MRI-PDFF. Although proton magnetic resonance spectroscopy ($^1$H-MRS) was recommended in clinical trials and experimental studies for the quantitative estimation of hepatic steatosis, it was not recommended in common clinical settings because of its high cost. Recently, chemical-shift-encoded MRI (CSE-MRI) method has shown promising results, but accessibility to MRI is limited in various clinical settings, including primary care. Moreover, CT is almost routinely used clinically in patients with poor sonic view due to obesity or anatomical characteristics, although it is accompanied by elevated liver enzyme levels. Therefore, CT could have an advantage over MRI for quantifying liver fat content in various particular clinical conditions, such as routine surveillance or opportunistic detection. Kramer et al. evaluated the diagnostic accuracy of various imaging methods in the quantification of hepatic steatosis using 1H-MRS as the reference standard, and reported an excellent correlation between HU value and $^1$H-MRS. Another study demonstrated that CT-based liver fat quantification exhibited good correlation with MRI-PDFF measured by CSE-MRI. The results of the present invention support the results of previous studies, using histological hepatic steatosis, as well as MRI-PDFF, as a reference standard. Consistent with the results of previous studies, the results of the present invention demonstrate that CT-based liver fat quantification validated as a result of histological examination is a useful alternative to MRI-based liver fat quantification. Compared with previous studies, the present invention enrolled only patients with low-grade hepatic steatosis. Evaluation of the severity of fatty liver in these low-grade hepatic steatosis patients is of great clinical importance in terms of metabolic diseases. Several studies have emphasized that the degree of hepatic steatosis should be classified, even in patients with mild hepatic steatosis. Li et al. have reported that patients with liver fat content >10% had higher odds ratios of impaired glucose regulation than those with liver fat content <10%. Ducluzeau et al. have also reported that hepatic fat fraction between 5% and 10% confers the same risk of having the metabolic syndrome and that hepatic steatosis >10% is associated with a very high probability of having the metabolic syndrome. Therefore, if the L-S HU value presented by the present invention is used, it is expected to be helpful in classifying the severity of low-grade steatosis patients and to suggest a differentiated treatment strategy to the patients. In the future, further studies will be needed on whether the liver fat content measured using CT could predict the prognosis in patients with low-grade hepatic steatosis.

The present invention also demonstrated that the HU values were useful in evaluating the degree of intrahepatic inflammation in patients with biopsy-proven NAFLD. Hepatocyte injury and inflammation has been known to be the most important factors in the progression of fibrosis, and reducing intrahepatic inflammation has been known to be associated with improvement of fibrosis. In particular, Brunt et al. found that an improvement in NAS of 2 points or more as well as resolution of NASH was most strongly associated with fibrosis improvement. However, because biopsy is invasive, there is a limit to repeatedly performing liver biopsy to evaluate the improvement of NASH in patients who have been diagnosed with NASH through histological examination. Therefore, if there is a noninvasive method to evaluate the improvement of intrahepatic inflammation, it would be helpful to evaluate the effectiveness of treatment and to determine whether to continue current treatment or change to another treatment option. In the present invention, L-S HU values discriminated patients with NAS of 3 or higher with a sensitivity of 92% and specificity of 90%, and patients with a NAS of 5 or higher with a sensitivity of 100% and specificity of 82% in patients with low-grade liver steatosis. Considering the high accuracy of the L-S HU value in evaluating the degree of intrahepatic inflammation observed in the present invention, we think that L-S HU value could be used in determining the improvement of intrahepatic inflammation in patients with biopsy-proven NAFLD.

The present invention had several limitations. First, the number of enrolled patients was relatively small, which may have reduced the generalizability of the results. Second, the performance of t HU values, the HSI, and the FLI for diagnosing mild hepatic steatosis or grading the severity of hepatic steatosis could not be directly compared with that of ultrasound. Multicenter, large cohort prospective studies are required to overcome these limitations.

In conclusion, the HU values are feasible for quantifying and stratifying hepatic fat content and for evaluating the degree of intrahepatic inflammation, and the HSI and the FLI are also useful tools for diagnosing mild hepatic steatosis.

The present invention has been described above by way of example, and those skilled in the art will appreciate that various modifications may be made without departing from the essential characteristics of the present invention. Accordingly, the embodiments disclosed herein are not intended to limit the present invention but to describe the present invention, and the spirit and scope of the present invention are not limited by these embodiments. The protection scope of the present invention should be interpreted by the following claims, and all the technologies within the equivalent scope should be interpreted as being included in the scope of the present invention.

What is claimed is:

1. A method for estimating a nonalcoholic fatty liver disease activity score (NAS), comprising:
   obtaining an abdominal computed tomography (CT) image;
   calculating a value (L-S HU) obtained by subtracting the average HU value of the spleen from the average HU value of the liver in the image; and
   calculating the nonalcoholic fatty liver disease activity score (NSA) using the L-S HU,
   wherein the calculation of NSA uses the following equation: NAS=2.889−(0.062×[L-S HU]), and
   wherein it is classified as nonalcoholic steatohepatitis where the NAS is 3 or more.

2. A method of providing diagnostic information for nonalcoholic steatohepatitis, comprising:
   obtaining an abdominal computed tomography (CT) image;
   calculating a value (L-S HU) obtained by subtracting the average HU value of the spleen from the average HU value of the liver in the image;
   calculating a nonalcoholic fatty liver disease activity score (NAS) using the L-S HU; and
   displaying the degree of nonalcoholic steatohepatitis (NASH) according to the NAS level,
   wherein the calculation of NSA uses the following equation: NAS=2.889−(0.062×[L-S HU]), and
   wherein it is classified as nonalcoholic steatohepatitis where the NAS is 3 or more.

* * * * *